US011538214B2

United States Patent
Sorkine Hornung et al.

(10) Patent No.: US 11,538,214 B2
(45) Date of Patent: Dec. 27, 2022

(54) SYSTEMS AND METHODS FOR DISPLAYING STEREOSCOPIC RENDERED IMAGE DATA CAPTURED FROM MULTIPLE PERSPECTIVES

(71) Applicant: Meta Platforms Technologies, LLC, Menlo Park, CA (US)

(72) Inventors: Alexander Sorkine Hornung, Zurich (CH); Panya Inversin, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/093,228

(22) Filed: Nov. 9, 2020

(65) Prior Publication Data
US 2022/0148254 A1 May 12, 2022

(51) Int. Cl.
*G06T 15/00* (2011.01)
*G06T 15/20* (2011.01)
*H04N 13/239* (2018.01)

(52) U.S. Cl.
CPC ......... *G06T 15/205* (2013.01); *H04N 13/239* (2018.05)

(58) Field of Classification Search
None
See application file for complete search history.

(56) References Cited

U.S. PATENT DOCUMENTS

| 9,094,576 | B1* | 7/2015 | Karakotsios | H04N 7/157 |
| 9,240,069 | B1* | 1/2016 | Li | G06T 15/00 |
| 2009/0160931 | A1* | 6/2009 | Pockett | H04N 13/25 |
| | | | | 348/42 |
| 2012/0182403 | A1* | 7/2012 | Lange | H04N 13/363 |
| | | | | 348/51 |

(Continued)

FOREIGN PATENT DOCUMENTS

WO 2018116253 A1 6/2018

OTHER PUBLICATIONS

"Understanding Stereoscopic_3D in After Effects," Copyright © 2020 Adobe, https://helpx.adobe.com/after-effects/kb/stereoscopic-3d-effects.html#main_Understanding_convergence, 21 pages, Apr. 5, 2016.

(Continued)

*Primary Examiner* — Anh-Tuan V Nguyen
(74) *Attorney, Agent, or Firm* — Baker Botts L.L.P.

(57) ABSTRACT

A method includes receiving, through a network by a computing system associated with an artificial-reality device, video data of a user of a second computing system comprising a first and second image of the user. The first and second images may be captured concurrently by a first camera and a second camera of the second computing system, respectively. The computing system generates a planar proxy for displaying the user and determines a pose for the planar proxy within a three-dimensional virtual environment. The computing system renders a left image for a left-eye display and a right image for a right-eye display (Continued)

of the artificial-reality device based on the planar proxy having the determined pose and the first image, and the planar proxy having the determined pose and the second image, respectively. The computing system displays the rendered left image and right image using the left-eye display and right-eye display, respectively.

18 Claims, 8 Drawing Sheets

(56) References Cited

U.S. PATENT DOCUMENTS

| | | | | |
|---|---|---|---|---|
| 2013/0141530 A1* | 6/2013 | Zavesky | ........... | G06T 19/20 348/43 |
| 2013/0321564 A1* | 12/2013 | Smith | ........... | G06T 17/00 348/14.08 |
| 2014/0028669 A1* | 1/2014 | Tsukagoshi | ........... | A61B 6/462 345/419 |
| 2014/0086482 A1* | 3/2014 | Gallo | ........... | H04N 13/133 382/165 |
| 2014/0098179 A1* | 4/2014 | Moore | ........... | H04N 13/117 348/E7.083 |
| 2015/0331576 A1 | 11/2015 | Piya et al. | | |
| 2016/0191887 A1* | 6/2016 | Casas | ........... | G06F 3/017 348/47 |
| 2016/0275681 A1* | 9/2016 | D'Alessandro | ........... | A61B 5/7425 |
| 2017/0193711 A1* | 7/2017 | Lenchner | ........... | H04N 7/157 |
| 2017/0372517 A1* | 12/2017 | Sukhomlinov | ........... | H04N 13/344 |
| 2018/0101989 A1* | 4/2018 | Frueh | ........... | G06K 9/00255 |
| 2018/0174347 A1* | 6/2018 | Chaney | ........... | G06T 13/40 |
| 2018/0218178 A1* | 8/2018 | Chung | ........... | G06F 3/0488 |
| 2019/0306484 A1* | 10/2019 | Leiphon | ........... | H04N 13/332 |
| 2019/0355150 A1* | 11/2019 | Tremblay | ........... | G06N 3/0454 |
| 2019/0394443 A1* | 12/2019 | Schickel | ........... | H04N 5/272 |
| 2020/0195889 A1* | 6/2020 | Sakai | ........... | H04N 7/157 |
| 2020/0322575 A1 | 10/2020 | Valli | | |
| 2021/0044779 A1* | 2/2021 | Prins | ........... | H04N 7/15 |
| 2021/0136342 A1* | 5/2021 | Bina | ........... | H04N 21/4223 |

OTHER PUBLICATIONS

International Search Report and Written Opinion for International Application No. PCT/US2021/055693, dated Mar. 30, 2022, 21 pages.

* cited by examiner

600

SYSTEMS AND METHODS FOR DISPLAYING STEREOSCOPIC RENDERED IMAGE DATA CAPTURED FROM MULTIPLE PERSPECTIVES

TECHNICAL FIELD

This disclosure generally relates to computer graphics and displaying rendered image data.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers

SUMMARY OF PARTICULAR EMBODIMENTS

Embodiments described herein cover systems, methods, and media to display image data captured from multiple perspectives on artificial reality devices. By rendering and displaying image data of a user or subject captured from multiple perspectives, embodiments disclosed herein simulate three-dimensional reproductions of a user in a virtual environment without the complex hardware setups and significant power and bandwidth requirements traditionally required for three-dimensional reproductions. The disclosed embodiments are useful for a variety of applications, for example a video calling experience using an artificial reality device.

In one embodiment a computing system may receive image data comprising multiple perspectives of a subject or user and utilize one or more techniques described herein to render and display multiple-perspective image data to a second user of artificial reality system that simulates a three-dimensional experience. In particular embodiments, a computing system may further utilize, for example and not by way of limitation, a planar proxy or a 3D mesh in a virtual environment in order to render and display the multiple-perspective image data. The techniques described herein improve upon existing technology by providing an immersive, multiple-perspective experience, that improves image quality and depth perception around object silhouettes when compared to two-dimensional reproductions, while simultaneously reducing power and data bandwidth requirements when compared to three-dimensional reproductions.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
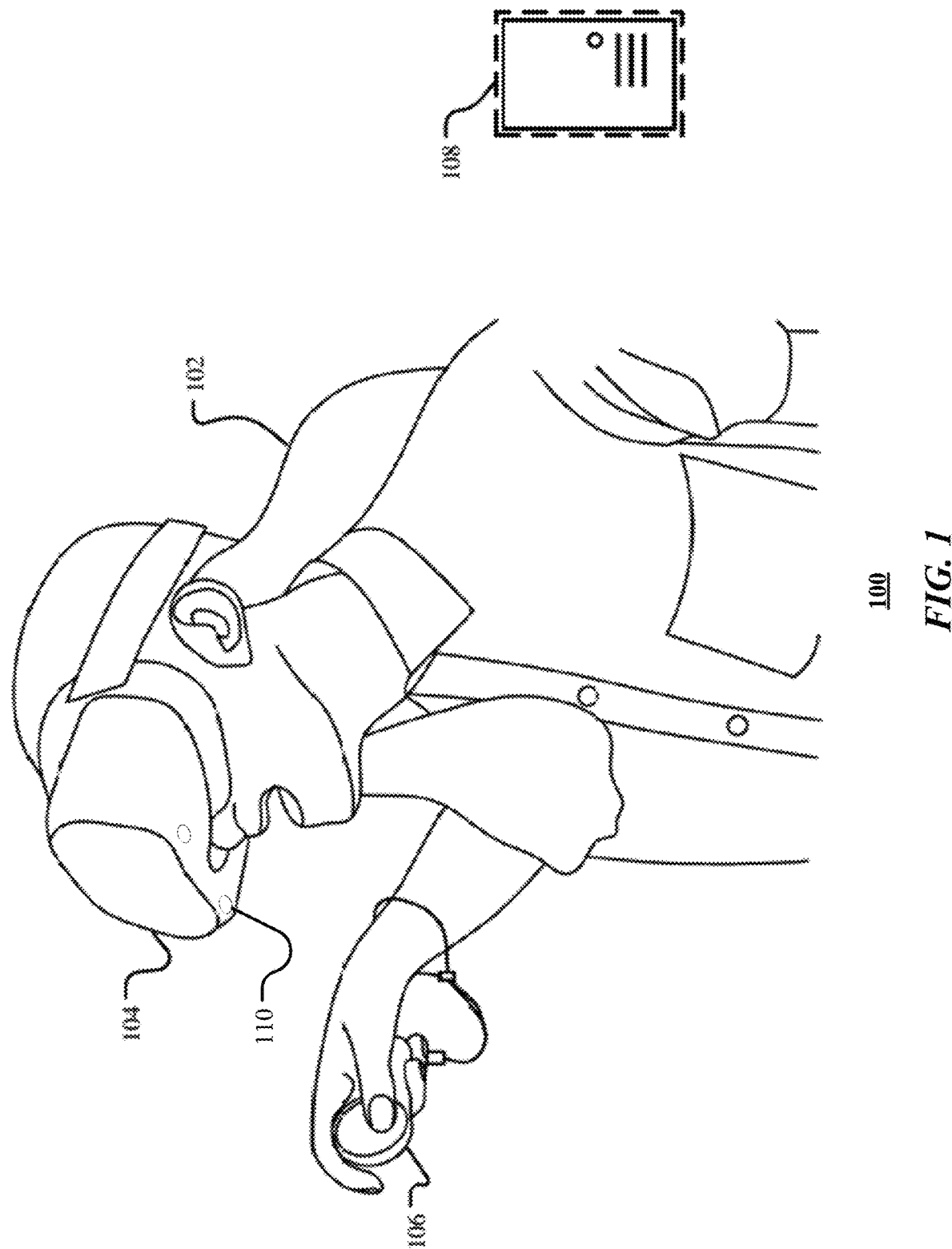
FIG. 1 illustrates an example artificial reality system.

FIG. 1 illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102 via a left-eye display and a right-eye display. The headset 104 may include an audio device that may provide audio artificial reality content to the user 102. The headset 104 may comprise one or more cameras 110 which can capture images and videos of environments. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred to as a head-mounted display (HMD).

One or more controllers 106 may be paired with the artificial reality system 100. In particular embodiments one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

In particular embodiments the computing system 108 may receive sensor data from one or more components of artificial reality system 100. For example and not by way of limitation, the headset 104 may include a gyroscope or inertial measurement unit that tracks the user's real-time movements and output sensor data to represent or describe the movement. The sensor data provided by such motion-tracking sensors may be used by the computing system 108 to determine the user's current orientation and provide that orientation to the rendering engine to orient/reorient the virtual camera in the 3D space. As another example and not by way of limitation, the one or more controllers 106 may include inertial measurement units (IMUs) and infrared (IR) light emitting diodes (LEDs) configured to collect and send IMU sensor data to the computing system 108. In particular embodiments the computing system 108 may utilize one or more sensor data with one or more tracking techniques, for example and not by way of limitation, SLAM tracking or IR-based tracking, to determine a pose of one or more components of artificial reality system 100.

In particular embodiments the computing system 108 may receive one or more image data from one or more components of artificial reality system 100. In particular embodiments this image data comprises image data captured from one or more cameras 110 associated with artificial reality system 100. For example, FIG. 1 depicts one or more cameras 110 coupled within headset 104. These one or more cameras 110 may be positioned to capture images associated with various perspectives, for example and not by way of limitation, one or more cameras associated with headset 104 that face downward (e.g. towards the feet of user 102 while standing).

In particular embodiments, the computing system 108 may determine a pose of the one or more cameras 110 in a three-dimensional space. The computing system may utilize one or more of the sensor data or the image data to determine a pose of the one or more cameras 110. In particular embodiments the computing system 108 may utilize a localization technique, such as SLAM, to determine the pose of the one or more cameras 110 in a three-dimensional coordinate space. In particular embodiments this pose may be represented using one or more coordinate systems, for example and not by way of limitation, via an absolute global coordinate system (e.g., x, y, z) or via a localized coordinate system relative to one or more components of artificial reality system 100, for example and not by way of limitation, a headset 104 or one or more controllers 106.

In particular embodiments computing system 108 may determine a pose of the headset 104 associated with user 102. The headset pose may be determined by utilizing any of the sensor data or image data received by the computing system 108. The headset pose associated with user 102 may comprise a location and an orientation of the headset 104. In particular embodiments the location and orientation comprising the headset pose associated with user 102 may be represented using one or more coordinate systems, for example and not by way of limitation, via an absolute global coordinate system (e.g., x, y, z), or via a localized coordinate system relative to one or more components of artificial reality system 100 or one or more joints of user 102, for example and not by way of limitation, one or more controllers 106.

In particular embodiments computing system 108 may determine a controller pose of one or more controllers 106 associated with user 102. The controller pose associated with user 102 may be determined by utilizing any of the sensor data or image data received by the computing system 108. In particular embodiments the computing system 108 may use one or more computer vision techniques, for example and not by way of limitation, image classification or object detection, to determine the pose of the controller 106 associated with user 102. The controller pose associated with user 102 may comprise a location and an orientation of controller 106. The location and orientation comprising the controller pose associated with user 102 may be represented using one or more coordinate systems, for example and not by way of limitation, via an absolute global coordinate system (e.g., x, y, z), or via a localized coordinate system relative to one or more components of artificial reality system 100 or one or more joints of user 102, for example and not by way of limitation, headset 104. Methods for determining controller poses are described further in U.S. application Ser. No. 16/734,172, filed Jan. 3, 2020, entitled "Joint Infrared and Visible Light Visual-Inertial Object Tracking," hereby incorporated by reference in its entirety.

Artificial reality systems are utilized for a variety of applications, including allowing two or more users to communicate with each other in a video calling application that transmits audio and image data (e.g., video) of each user. Artificial reality systems commonly use two-dimensional image data in video calling applications, which are computational and resource efficient, but do not utilize the full capabilities of artificial reality system to provide a rich, immersive video calling experience. Other artificial reality systems utilize three-dimensional video calling to render a full model of a user or scene in an artificial reality environment. However, full three-dimensional video calling is not conducive to average consumers, as it requires complex hardware setups and significant power and bandwidth requirements.

Further, the nature of human binocular vision results in real-world objects exhibiting view dependent appearance differences (e.g., reflections, refractions) only perceivable due to the dual perspectives of an object perceived by two human eyes. These view dependent appearance differences play an important role in the human brain's ability to perceive and identify different materials. However, both two-dimensional and three-dimensional video calling applications often utilize a single input RGB camera to capture image data, which when displayed to a user fails to exhibit these view-dependent appearance differences (e.g., gloss and specular reflections on a glossy desk) because only a single perspective is captured and rendered for display.

The present disclosure improves upon existing artificial reality video calling technology by using stereoscopic rendering techniques for video calling using artificial reality systems. At a high level, a computing system may receive image data comprising multiple perspectives of a subject or user and utilize one or more techniques described herein to render and display multiple-perspective image data to the user of artificial reality system that simulates a three-dimensional video calling experience. In particular embodiments, a computing system may further utilize, for example and not by way of limitation, a planar proxy or a 3D mesh in a virtual environment in order to render and display the multiple-perspective image data. Using the techniques described herein, the disclosed embodiments improve upon existing technology by providing an immersive, multiple-perspective video calling experience, with notable improvements in image quality and depth perception around object silhouettes, while simultaneously reducing power and data bandwidth requirements when compared to three-dimensional video calling.

Figure 2:
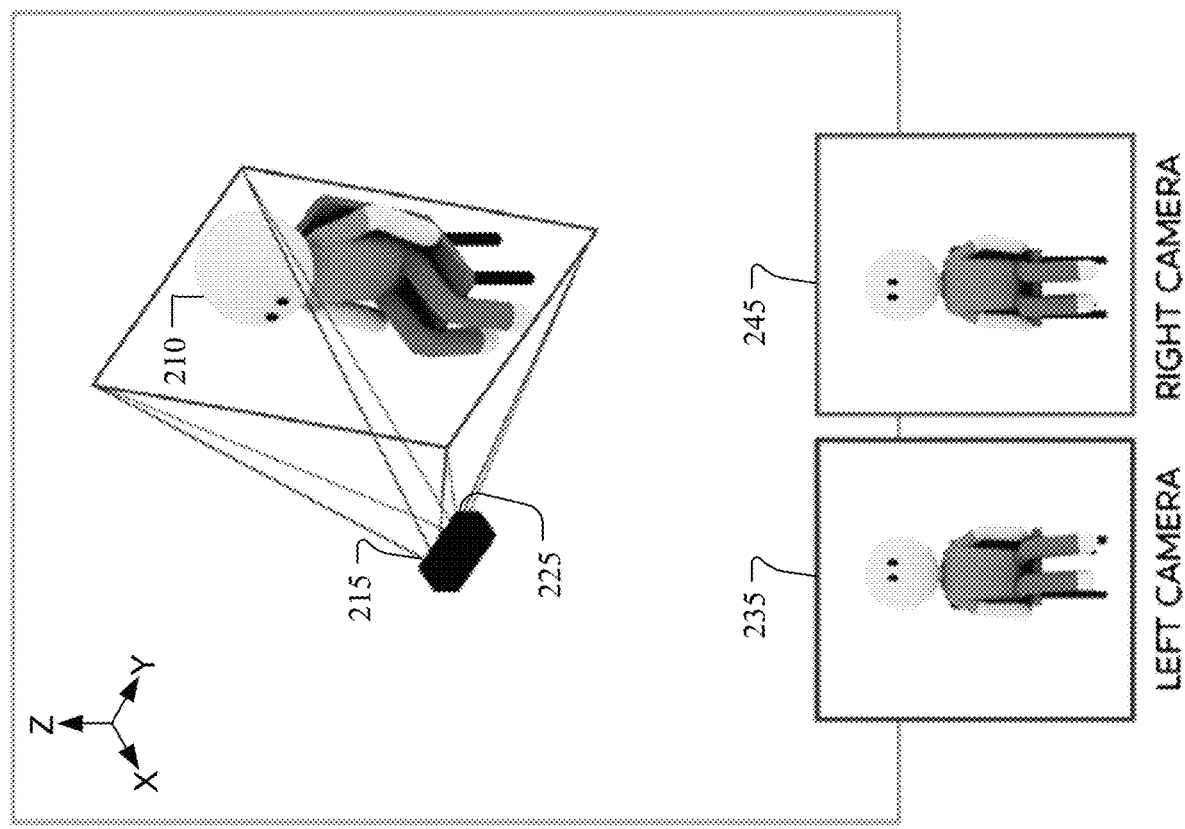
FIG. 2 illustrates a plurality of cameras capturing image data of a user in an environment.

In particular embodiments a user of a computing system associated with an artificial-reality device may receive image data of an environment comprising a second user of a second computing system associated with a second artificial-reality device. FIG. 2 illustrates a plurality of cameras capturing image data of a user in an environment. In particular embodiments the subject 210 may be a user of a computing system associated with an artificial reality device. In particular embodiments the image data may be video data. In particular embodiments two cameras, left camera 215 and right camera 225, may be used to capture image data of the subject 210 in the environment. In particular embodiments each of the plurality of cameras may be included within a single device (as depicted in FIG. 2), for example a mobile computing device comprising a plurality of cameras, or one or more cameras of the plurality of cameras may be included in separate devices (e.g., camera 215 may be a camera on a mobile computing device, whereas camera 225 may be a webcam) and communicatively coupled or associated with a computing system. In particular embodiments the plurality of cameras may be communicatively coupled or associated with the computer system associated with an artificial reality device of subject 210.

In particular embodiments, each camera in the plurality of cameras is positioned to be the same vertical distance from the floor in a level room (i.e., each camera shares a common coordinate on the applicate axis, or z-axis, in the x-y-z coordinate space depicted in FIG. 2). In particular embodiments, each camera in the plurality of cameras is positioned along the ordinate axis, or y-axis as depicted in FIG. 2, such that any two adjacent cameras are located at a known distance from one another on the ordinate axis. In particular embodiments the known distance between any two cameras on the ordinate axis may be adjusted by a computing system. As an example and not by way of limitation, the distance between any two cameras may be within the approximate range of human interpupillary distance (e.g., between 25 mm and 80 mm), smaller than the approximate range of human interpupillary distance (e.g., the approximate range of distances between any two cameras on a client device (e.g., between 5 mm and 25 mm)), or at a wider than human interpupillary distance that simulates the vision of a larger animal.

In particular embodiments each camera of the plurality of cameras concurrently captures image data of the subject 210 from a perspective that is different from each of the other cameras in the plurality of cameras. As depicted in FIG. 2, left camera 215 may capture left camera image 235, and right camera 225 may capture right camera image 245, where the perspective of left camera image 235 differs from right camera image 245 in a manner such that the image data collected from camera 215 is from a different perspective than camera 225 and all other cameras in the plurality of cameras. In particular embodiments this left image 235 may represent a perspective of the scene as observed from a left-eye of a person observing subject 210, whereas in particular embodiments the right image 245 may represent a perspective of the scene as observed from a right-eye of a person observing subject 210. In particular embodiments these different perspectives may be achieved by ensuring each camera of the plurality of cameras has a unique pose (comprising a position and orientation of the camera) from each of the other cameras. In particular embodiments, different perspectives may be achieved by altering one or more properties of one or more cameras in the plurality of cameras (e.g., left camera 215 has a wide-angle lens, whereas right camera 225 has a telephoto lens). While FIG. 2 depicts image data from two perspectives captured from two different cameras, this disclosure contemplates any number of cameras in the plurality of cameras, each capturing image data from a different perspective. In particular embodiments the captured image data may be transmitted to a computing system associated with an artificial reality-device of a second user for rendering and displaying the captured image data on the artificial-reality device.

In particular embodiments a computing system may adjust one or more parameters of one or more of the plurality of cameras. These adjustments may be made prior to, or contemporaneous with, capturing the image data. In particular embodiments one or more of these adjustments to one or more cameras may adjust the perspective of subject 210 as observed in the image data. As an example, in particular embodiments, a computing system may adjust the baseline distance between one or more cameras of the plurality of cameras on the ordinate axis. In particular embodiments the default baseline distance between one or more cameras of the plurality of cameras is approximately equal to the average human inter-pupillary distance (e.g., between 25 mm to 80 mm). In particular embodiments this adjustment may fall within a predetermined range. In particular embodiments, a configuration with a smaller baseline distance between cameras (e.g., 35 mm) will result in an image of a larger scene, where the user appears larger in size, but farther away (i.e., a greater distance from the plurality of cameras along the abscissas, or x-axis), whereas a configuration with a larger baseline distance between cameras (e.g., 75 mm) will result in an image with a smaller scene, where the user appears smaller in size, but closer to the cameras (i.e., a lesser distance from the plurality of cameras along the abscissas, or x-axis).

In particular embodiments the computing system may further adjust the scale of the rendered stereo images, thereby scaling the disparities, perceived size, and perceived distance of the user from the cameras in the image data. These adjustments may result in, for example and not by way of limitation, images where the subject is perceived as more life size, but further away from the cameras.

In particular embodiments, a computing system may adjust the stereo convergence offset. In particular embodiments this convergence offset may fall within a predetermined range, for example and not by way of limitation between 0.0 and 1.0. A display configuration with a smaller convergence offset (e.g., approximately 0.0) will result in an image with greater depth, where the background of the scene is mapped to infinity (i.e., the background appears at a greater distance from the plurality of cameras along the abscissas, or x-axis), whereas a configuration with a larger convergence offset (e.g., approximately 1.0) will result in an image with less depth, where the background of the scene will appear at approximately the same depth as the subject. (i.e., the background appears at a smaller distance from the plurality of cameras along the abscissas, or x-axis).

In particular embodiments, one or more adjustments to one more or cameras may be executed by the computing system associated with subject 210, or these one or more adjustments may be executed by a computing system that is receiving the image data from subject 210, for example and not by way of limitation a computing system associated with an artificial reality device of a second user that is viewing the images of subject 210.

Particular embodiments disclosed herein also permit a computing system to adjust one or more properties of the captured image data to, for example and not by way of limitation, improve the image quality or reduce the resources required to render and display the image data on an artificial-reality device. In particular embodiments, one or more adjustments to the captured image data may be executed by the computing system associated with subject 210 prior to transmitting the image data, or one or more adjustments to the captured image data may be executed by a computing system that is receiving the image data from subject 210, for example and not by way of limitation a computing system associated with an artificial reality device of a user that is viewing the images of subject 210.

In particular embodiments, a computing system may determine and adjust the color of one or more captured images. In particular embodiments each pixel in the captured images may be assigned a red/green/blue (RGB) color value (e.g., a white pixel may be assigned a RGB color value of (255, 255, 255)) and a corresponding location coordinate value (e.g., x, y coordinate). In particular embodiments, a computing system can use this data to enhance the image for the user. In particular embodiments, the RGB color values may be compared to RGB color values of typical environments for lighting and color correction purposes. For example, if the RGB color values indicate there is currently a blue tint in the captured image, the computing system may adjust one or more pixels in one or more captured images to color-correct the scene.

In particular embodiments a computing system may use the assigned pixel RGB and location coordinate values to color-correct one or more pixels in the one or more images relative to one another. For example and not by way of limitation, due to the different perspectives or settings of each camera, the RGB color of a pixel in left image 235 may differ from right image 245. For example, a pixel at global location coordinate (0, 40) in left image 235 may have an RGB color value of (165, 42, 42), whereas in right image 245 a pixel at the corresponding global location (0, 40) may have an RGB color value of (160, 82, 45). In particular embodiments a computing system may adjust the RGB color value of one or more pixels such that the RGB color value of the pixels at a particular location are consistent across each captured image. Doing so may provide a more consistent, aesthetically pleasing experience for the users when the images are rendered and displayed.

In particular embodiments a computing system may segment the images prior to rendering and displaying the images on an artificial-reality device. For example, a computing system may identify and segment the foreground (e.g., the user) from the background environment (e.g., chairs, a table, etc.) in each image. In particular embodiments, the computing system may determine one or more coordinate points in left image 235 and right image 245 that correspond to a plurality of surface points on subject 210. In particular embodiments each of these coordinate points may correspond to a particular joint (e.g., a head joint, neck joint, etc.) of the subject 210. In particular embodiments a computing system may further utilize the assigned RGB color values of the pixels in the images as previously described to distinguish the foreground (e.g., the user) from the background environment. In particular embodiments the computing system may generate a bounding box for each image that encompasses one or more points in the set of points. The bounding box may be large enough to contain all the points in the point set. In particular embodiments a computing system may remove the background image data from the foreground image data, such that only the foreground data comprising the image data in the bounding box may be transmitted and rendered by the computing system. By only rendering and displaying the foreground area of the images, the computing system can reduce bandwidth requirements and latency during a video calling experience.

Figure 3:
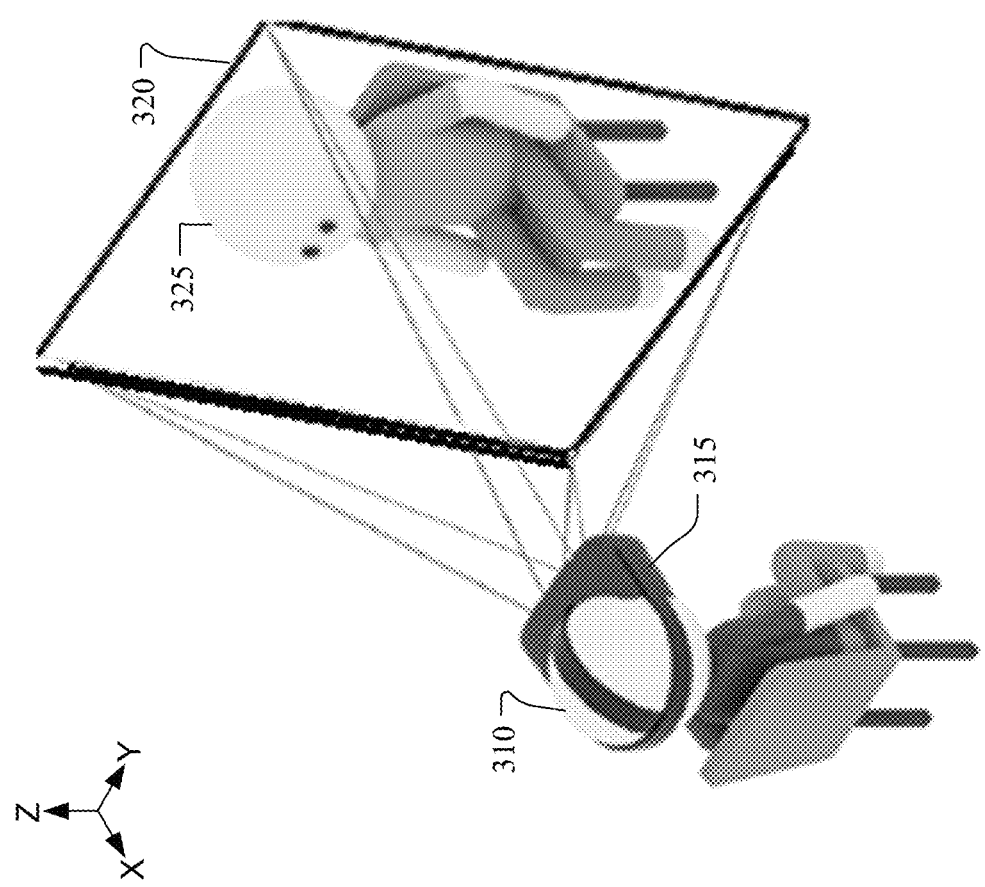
FIG. 3 illustrates a planar proxy generated in a virtual environment.

In particular embodiments the computing system may generate a planar proxy in the virtual reality environment for displaying the received image data of subject 210. FIG. 3 illustrates a planar proxy generated in a virtual environment. In particular embodiments, viewer 310 wearing artificial reality device 315 associated with a computing system may wish to view the image data of subject 210, through for example, a video calling application. Rendering a planar proxy 320 permits the computing system to display multiple-perspective image data 325, which in particular embodiments comprises simultaneously displaying both left camera image 235 on a left-eye display and right camera image 245 on a right-eye display with planar proxy 320. Utilizing a planar proxy to render and display the image data provides a realistic display of subject 210 to viewer 310 with a relative reduction in visual artifacts, as well as reduced computational, power, and data bandwidth requirements.

In particular embodiments, the computing system may further determine a pose for planar proxy 320 within the three-dimensional virtual environment. The pose of planar proxy 320 may be determined based on, for example and not by way of limitation, the virtual environment of viewer 310, the application viewer 310 is interacting with, or through selection by viewer 310. In particular embodiments, the pose of planar proxy 320 may be anchored in the virtual environment (i.e., posed a fixed location and orientation in the virtual environment). In this embodiment, planar proxy 320 appears fixed in the virtual environment, such that when viewer 310 of artificial reality device 315 moves closer to planar proxy 320, the multiple-perspective image data 325 rendered using planar proxy 320 appears larger in size. In particular embodiments, the pose of planar proxy 320 may be fixed based on an absolute coordinate in the virtual environment (e.g., at a particular x, y, z coordinate), or the pose of planar proxy 320 may be fixed relative to one or more fixed objects or locations in the virtual environment (e.g., posed at a coordinate relative to a wall or table in the virtual environment). A fixed (i.e., anchored) pose allows viewer 310 to view multiple-perspective image data 325 rendered with planar proxy 320 from different perspectives as viewer 310 moves throughout the virtual environment, and further permits viewer 310 to adjust their distance from planar proxy 320 as they move throughout the environment.

In particular embodiments, the pose of planar proxy 320 may be determined relative to the position of viewer 310 in the virtual environment, or relative to the position of an artificial reality device 315 associated with viewer 310, for example a headset or controller. In particular embodiments, the computing system may receive sensor data from artificial reality device 315 associated with viewer 310 to determine its position. In particular embodiments the computing system may further utilize a known relationship between viewer 310 and artificial reality device 315 to determine a pose of viewer 310 (e.g., a known relationship between the pose of artificial reality device 315 and the head pose of viewer 310). In particular embodiments the computing system may pose planar proxy 320 relative to, for example, the head pose of viewer 310 (e.g., head-locked) such that planar proxy 320 remains at a fixed distance and orientation from the head pose of viewer 310 at all times (i.e., moves with viewer 310 throughout the virtual environment). In this embodiment, the rendering of multiple-perspective image data 325 appears to "float" in the virtual environment at a predefined distance from viewer 310 of artificial reality device 315, and thus appears to be the same size and distance from viewer 310, even as viewer 310 moves throughout the virtual environment. This allows viewer 310 to view multiple-perspective image data 325 rendered with planar proxy 320 from the same perspective as viewer 310 moves throughout the virtual environment, which may be useful to, for example and not by way of limitation, conduct a video conference with subject 210 while walking through a virtual environment.

In particular embodiments the computing system may toggle between displaying a fixed (i.e., anchored) pose and a relative (i.e., floating) pose of planar proxy 320. In particular embodiments viewer 310 may toggle between a fixed (i.e., anchored) pose and a relative (i.e., floating) pose of planar proxy 320 by interacting with the one or more controllers 106 (e.g., pressing a controller button or moving a controller in particular manner).

Figure 4:
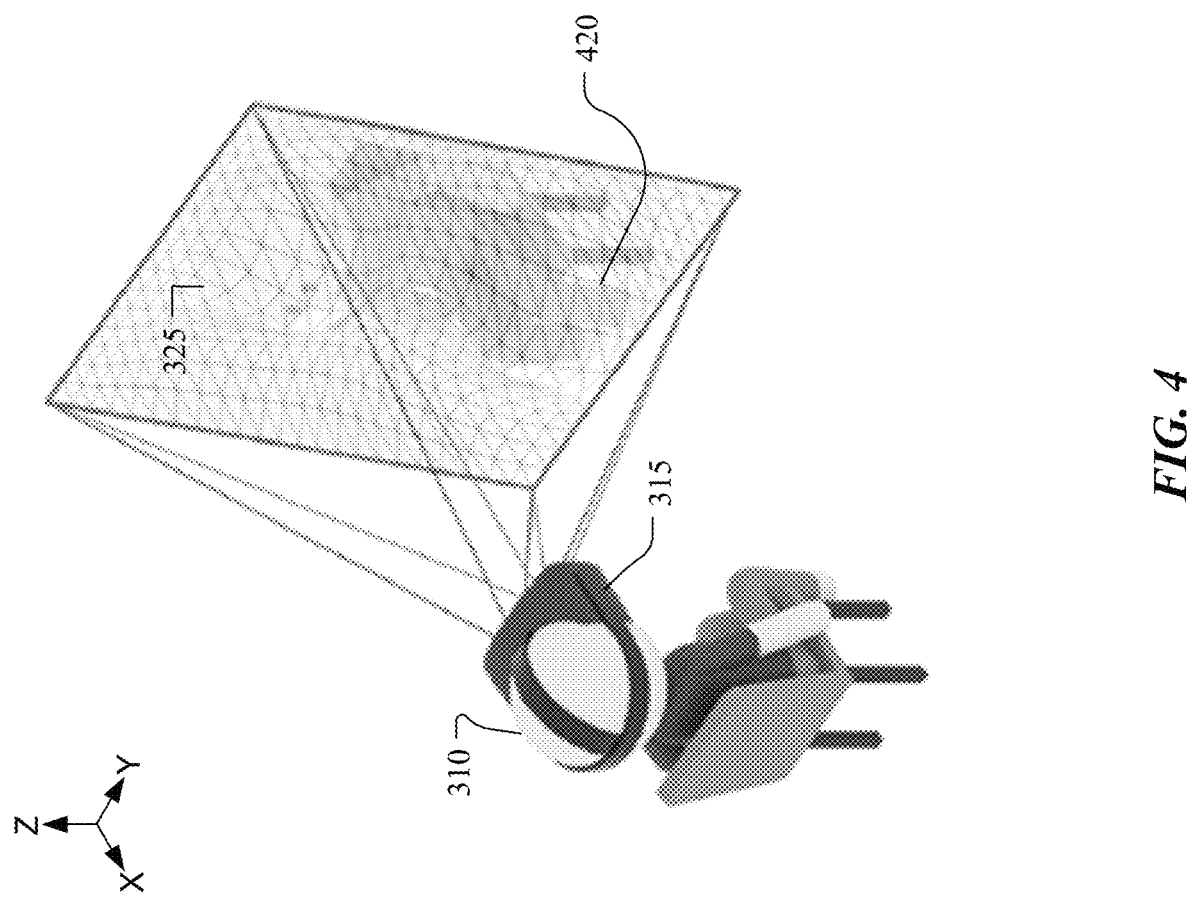
FIG. 4 illustrates a 3D mesh generated in a virtual environment.

In particular embodiments the computing system may, in lieu of or addition to planar proxy 320, generate a 3D mesh representing subject 210 in the virtual environment for rendering the captured image data of subject 210. FIG. 4 illustrates a 3D mesh generated in a virtual environment. In particular embodiments, viewer 310 wearing artificial reality device 315 may wish to view image data of subject 210, through for example, a video calling application. 3D mesh 420 may be generated using known techniques using, for example and not by way of limitation, captured sensor or image data of subject 210. In particular embodiments, 3D mesh 420 may simulate a three-dimensional projection of at least a portion of subject 210 in the virtual environment of viewer 310 (e.g., the head or upper torso of subject 210). Rendering a 3D mesh 420 permits the computing system to display multiple-perspective image data 325, which in particular embodiments comprises simultaneously displaying both left camera image 235 on a left-eye display and right camera image 245 on a right-eye display with 3D mesh 420.

In particular embodiments, the computing system may further determine a pose for 3D mesh 420 within the three-dimensional virtual environment. The pose of 3D mesh 420 may be determined based on, for example and not by way of limitation, the virtual environment of viewer 310, the application viewer 310 is interacting with, or through selection by viewer 310. In particular embodiments, the pose of 3D mesh 420 may be anchored in the virtual environment (i.e., posed a fixed location and orientation in the virtual environment). In this embodiment, 3D mesh 420 appears fixed in the virtual environment, such that when viewer 310 of artificial reality device 315 moves closer to 3D mesh 420, the multiple-perspective image data 325 rendered using 3D mesh 420 appears larger in size. In particular embodiments, the pose of 3D mesh 420 may be fixed based on an absolute coordinate in the virtual environment (e.g., at a particular x, y, z coordinate), or the pose of 3D mesh 420 may be fixed relative to one or more fixed objects or locations in the virtual environment (e.g., posed at a coordinate relative to a wall or table in the virtual environment). A fixed (i.e., anchored) pose allows viewer 310 to view multiple-perspective image data 325 rendered with 3D mesh 420 from different perspectives as viewer 310 moves throughout the virtual environment, and further permits viewer 310 to adjust their distance from 3D mesh 420 as they move throughout the environment.

In particular embodiments, the pose of 3D mesh 420 may be determined relative to the position of viewer 310 in the virtual environment, or relative to the position of an artificial reality device 315 associated with viewer 310, for example a headset or controller. In particular embodiments, the computing system may receive sensor data from artificial reality device 315 associated with viewer 310 to determine its position. In particular embodiments the computing system may further utilize a known relationship between viewer 310 and artificial reality device 315 to determine a pose of viewer 310 (e.g., a known relationship between the pose of artificial reality device 315 and the head pose of viewer 310). In particular embodiments the computing system may pose 3D mesh 420 relative to, for example, the head pose of viewer 310 (e.g., head-locked) such that 3D mesh 420 remains at a fixed distance and orientation from the head pose of viewer 310 at all times (i.e., moves with viewer 310 throughout the virtual environment). In this embodiment, the rendering of multiple-perspective image data 325 appears to "float" in the virtual environment at a predefined distance from viewer 310 of artificial reality device 315, and thus appears to be the same size and distance from viewer 310, even as viewer 310 moves throughout the virtual environment. This allows viewer 310 to view multiple-perspective image data 325 rendered with 3D mesh 420 from the same perspective as viewer 310 moves throughout the virtual environment, which may be useful to, for example and not by way of limitation, conduct a video conference with subject 210 while walking through a virtual environment.

In particular embodiments the computing system may toggle between displaying a fixed (i.e., anchored) pose and a relative (i.e., floating) pose of 3D mesh 420. In particular embodiments viewer 310 may toggle between a fixed (i.e., anchored) pose and a relative (i.e., floating) pose of 3D mesh 420 by interacting with the one or more controllers 106 (e.g., pressing a controller button or moving a controller in particular manner).

In particular embodiments the computing system may render the multiple-perspective image data 325 of subject 210 for display on an artificial reality device associated with viewer 310. For example, the computing system may render left camera image 235 and right camera image 245 for display on a left-eye display and a right-eye display, respectively, of an artificial reality device associated with viewer 310. In particular embodiments the captured images may be rendered based on the determined pose of a planar proxy, the determined pose of a 3D mesh, or using the corresponding images captured by the one or more cameras. In particular embodiments, one or more of the rendered images may include one or more adjustments to the properties of the captured image data as disclosed herein.

Figure 5:
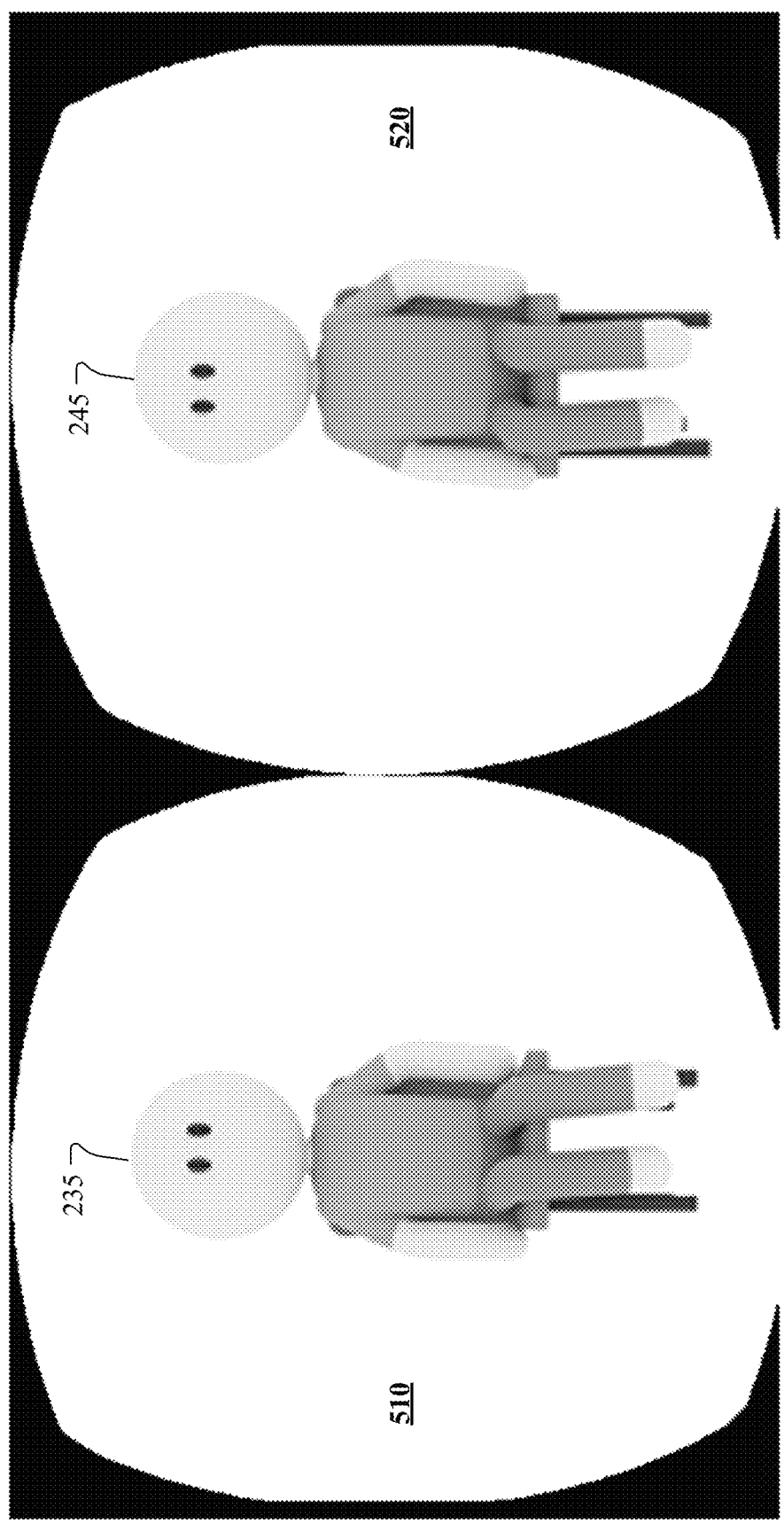
FIG. 5 illustrates rendered image data of a user displayed on an artificial reality device.

In particular embodiments, the rendered left camera image 235 and right camera image 245 can be simultaneously displayed on the left-eye display and right-eye display, respectively, of an artificial-reality device of viewer 310, simulating a 3D perspective of subject 210. FIG. 5 illustrates rendered image data of a user displayed on the display of an artificial reality device. In particular embodiments the computing system may render and display an image for each display of the artificial-reality device, for example, left-eye display 510 and right-eye display 520 of a headset. In particular embodiments an image captured from a camera representing a left-eye perspective, for example left camera image 235 captured by left camera 215, may be displayed on left-eye display 510. In particular embodiments an image captured from a camera representing a right-eye perspective, for example right camera image 245 captured by right camera 225, may displayed on right-eye display 520.

Displaying multiple-perspective image data 325, comprising for example left image 235 and right image 245, generates several improvements for a variety of applications, for example and not by way of limitation a video calling experience between subject 210 and viewer 310. For example, when multiple-perspective image data 325 is rendered based on planar proxy 320 representing subject 210, the computing system can simulate the visual appearance of a 3D calling experience with subject 210 without requiring a full 3D reconstruction of 210, which may be resource intensive. Further, displaying the multiple-perspective image data 325 on planar proxy 320 provides a reduction in visual artifacts, as well as reductions in computational, power, and data bandwidth requirements.

As another example, when multiple-perspective image data 325 is rendered in conjunction with generated 3D mesh 420, the output uses stereoscopic texture modeling to map the captured images to 3D mesh 420, which may represent a three-dimensional model of subject 210. This stereoscopic texture modeling renders features onto 3D mesh 420 which are only visible due to the multiple perspectives of human binocular vision (e.g., depth reconstruction, textures, or other intrinsic features of the user that may only be visible when the left-eye and right-eye perspectives are viewed simultaneously). For example, the image quality as perceived by viewer 310 is vastly improved around object silhouettes and improves the user's perception of glossy surfaces (e.g., a glass table or a mobile phone screen) due to refractions and highlights being properly reproduced when compared to monoscopic texturing. As another example, eye-contact with subject 210 can be simulated by rotating 3D mesh 420, and the 3D mesh 420 supports interactions in the virtual space, for example and not by way of limitation precise pointing gestures between callers, or manipulation of virtual objects by both users.

Further embodiments permit viewer 310 to simultaneously view two or more subjects using the methods described herein (e.g., a group video calling application). Additionally, when viewer 310 interacts with multiple callers, the computing system may utilize configuration data (e.g., extrinsic and intrinsic camera parameters, sensor data or image data from a computing system associated with the subject) to create a more consistent experience among multiple callers. As an example, viewer 310 initiates a three-way experience with a first subject and a second subject, where both the first and second subjects are simultaneously displayed to the viewer 310. In particular embodiments, the configuration data of the first subject may be different than the configuration data of second subject (e.g., the first subject may be located further away from the cameras than the second subject, the second subject may have cameras with wider baseline distances than the first subject, etc.). Without adjustment, simultaneously displaying the first subject and second subject may result in a displeasing experience for the viewer (e.g., the first subject may be much larger than the second subject, one subject may appear further away than the other, etc.).

To remedy this, the computing system may receive configuration data about the configuration of each subject, for example and not by way of limitation, the properties of the cameras or the distance between the subject and the camera, and adjust the perceived depth or location of all subjects to viewer 310. In particular embodiments, these adjustments may comprise, for example and not by way of limitation, adjusting the pose of a planar proxy or 3D mesh or scaling a planar proxy or 3D mesh. Through these adjustments, both the first subject and second subject may appear at the approximate same size and distance from viewer 310, despite different configurations.

Particular embodiments further permit the computing system to adjust the orientation of the multiple-perspective image data 325 based on the orientation of the artificial reality device associated with viewer 310. In particular embodiments the computing system may receive sensor data from the artificial reality device associated with viewer 310 and determine based on the sensor data, an orientation of the artificial-reality device associated with viewer 310. Using this orientation, the computing system may subsequently adjust the orientation of the displayed multiple-perspective image data 325 to match the orientation of the artificial-reality device associated with viewer 310. In particular embodiments, the computing system may further determine that the orientation of the artificial reality device exceeds a predetermined maximum threshold, for example, a particular viewing angle with which viewer 310 is viewing the multiple-perspective image data 325. In particular embodiments, the computing system may terminate the display of multiple-perspective image data 325 on the artificial reality device associated with viewer 310 based on the determination that the orientation of the artificial reality device exceeds a predetermined maximum threshold.

For simplicity, the embodiments disclosed herein describe methods for capturing image data of subject 210 from multiple perspectives and displaying these images to viewer 310. However, it should be appreciated that in particular embodiments these methods may be employed to simultaneously capture image data of viewer 310 from multiple perspectives and display these images to subject 210. In this way, subject 210 and viewer 310 can interact with each other through, for example and not by way of limitation, an artificial reality video calling experience such that both users can simultaneously view a display of simulated 3D image data of the other user.

Figure 6:
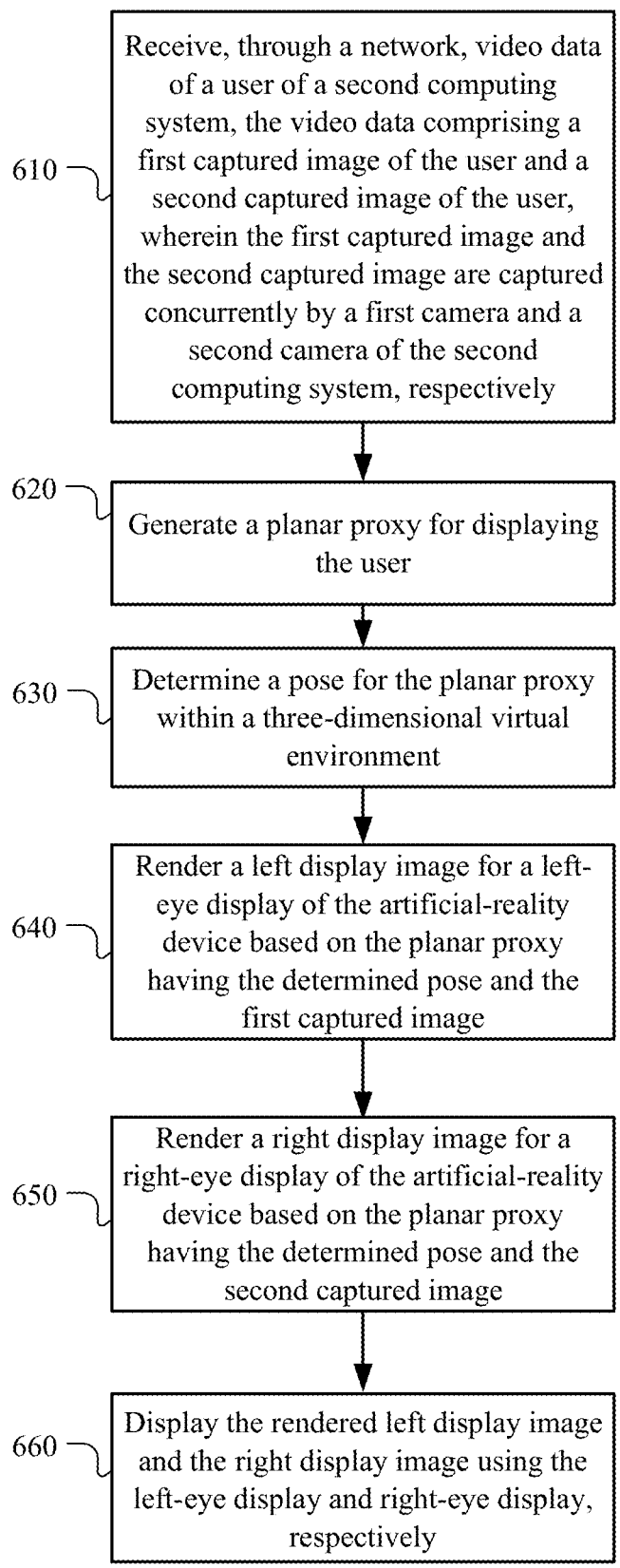
FIG. 6 illustrates an example method 600 for displaying stereoscopic rendered image data captured from multiple perspectives.

FIG. 6 illustrates an example method 600 for displaying stereoscopic rendered image data captured from multiple perspectives. The method may begin at step 610, where a computing system associated with an artificial-reality device receives, through a network, video data of a user of a second computing system, the video data comprising a first captured image of the user and a second captured image of the user, wherein the first captured image and the second captured image are captured concurrently by a first camera and a second camera of the second computing system, respectively. In particular embodiments two cameras, left camera and right camera, may be used to capture image data of the user in the environment. In particular embodiments, left camera and right camera are positioned to be the same vertical distance from the floor in a level room. In particular embodiments the known distance between left camera and right camera on the ordinate axis is approximately equal to the average human inter-pupillary distance. In particular embodiments a computing system may adjust one or more parameters of one or more of the cameras.

At step 620, the computing system generates a planar proxy for displaying the user. At step 630, the computing system determines a pose for the planar proxy within a three-dimensional virtual environment. In particular embodiments, the pose of the planar proxy may be anchored in the virtual environment (i.e., posed a fixed location and orientation in the virtual environment). In particular embodiments, the pose of the planar proxy may be determined relative to the position of a user viewing the displayed image data, or relative to the position of an artificial reality device associated with a user viewing the displayed image data, for example a headset or controller. In particular embodiments the computing system may toggle between displaying a fixed (i.e., anchored) pose and a relative (i.e., floating) pose of the planar proxy.

At step 640, the computing system renders a left display image for a left-eye display of the artificial-reality device based on the planar proxy having the determined pose and the first captured image. At step 650, the computing system renders a right display image for a right-eye display of the artificial-reality device based on the planar proxy having the determined pose and the second captured image. In particular embodiments the captured images may be rendered based on the determined pose of a planar proxy. At step 660, the computing system displays the rendered left display image and the right display image using the left-eye display and right-eye display, respectively.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for displaying stereoscopic rendered image data captured from multiple perspectives including the particular steps of the method of FIG. 6, this disclosure contemplates any suitable method for displaying rendered image data including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
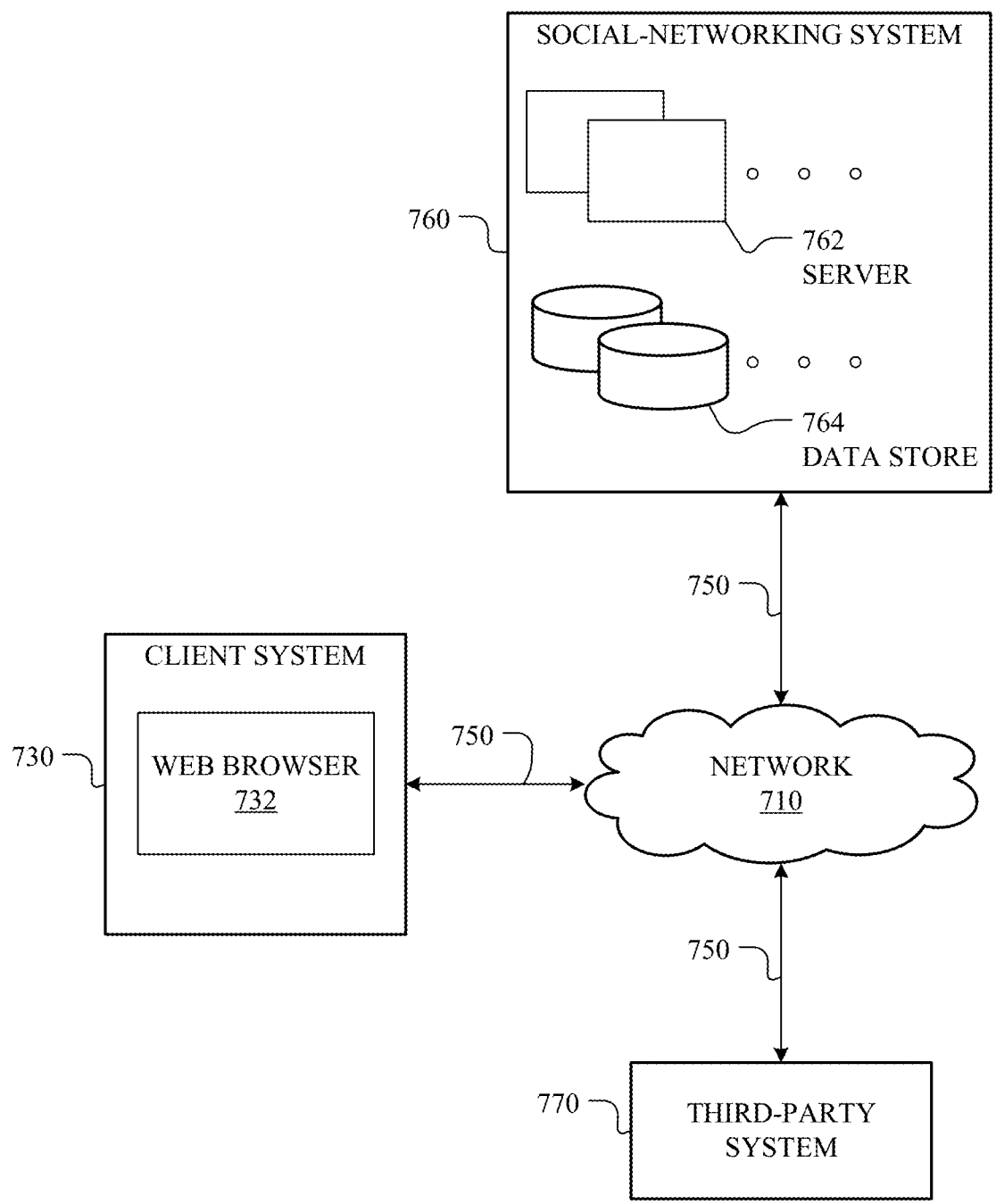
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, and may have one or more add-ons, plug-ins, or other extensions. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
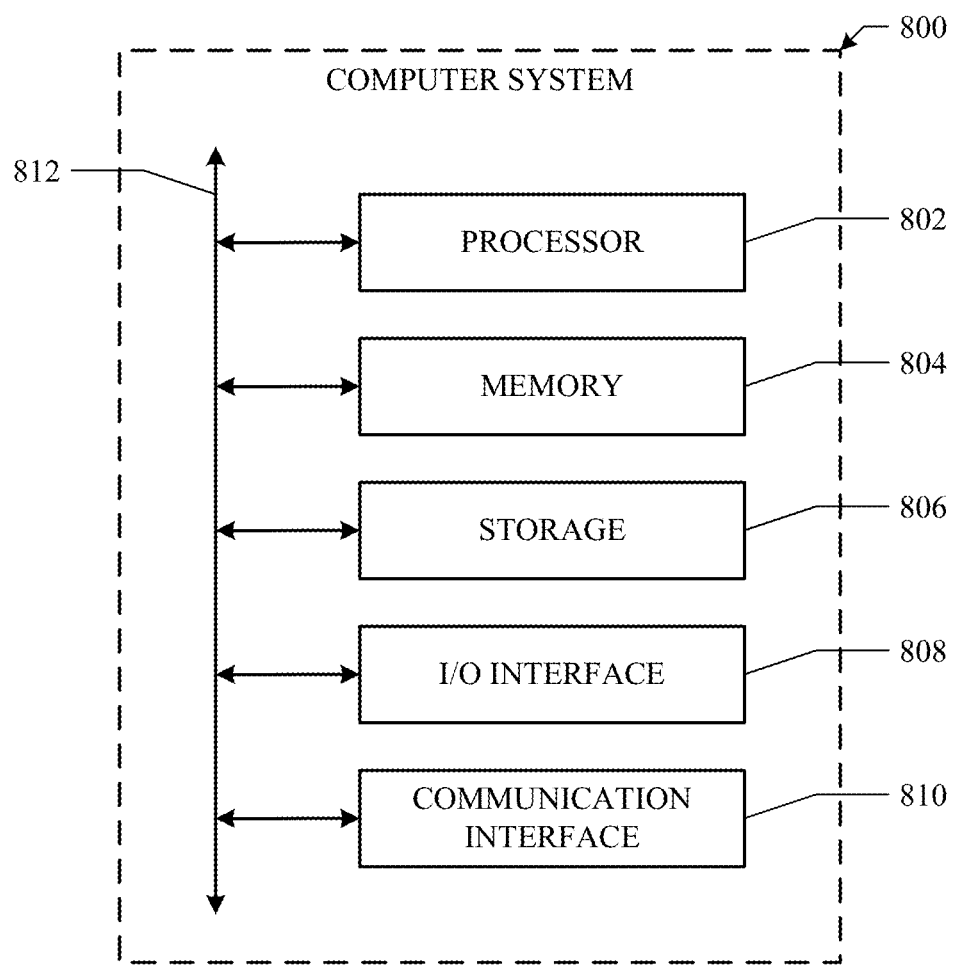
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first computing system associated with an artificial-reality device:
   receiving, through a network, video data of a user of a second computing system, the video data comprising a first captured image of the user and a second captured image of the user of the second computing system, wherein the first captured image and the second captured image are captured concurrently by a first camera and a second camera of the second computing system, respectively;
   generating a two-dimensional planar proxy of the user of the second computing system for displaying the user of the second computing system, wherein the two-dimensional planar proxy of the user of the second computing system is generated without a three-dimensional model of the user of the second computing system;
   determining a pose comprising a location and orientation of the two-dimensional planar proxy within a three-dimensional virtual environment, wherein the pose of the two-dimensional planar proxy is (1) a fixed pose in the three-dimensional virtual environment independent from a pose of the artificial-reality device in the three-dimensional virtual environment, or (2) a relative pose such that a spatial relationship between the artificial-reality device and the two-dimensional planar proxy remains fixed as the artificial-reality device moves in the three-dimensional virtual environment;

rendering a left display image for a left-eye display of the artificial-reality device based on the two-dimensional planar proxy having the determined pose and the first captured image;
rendering a right display image for a right-eye display of the artificial-reality device based on the two-dimensional planar proxy having the determined pose and the second captured image;
displaying the rendered left display image and the right display image using the left-eye display and right-eye display, respectively;
determining a viewing angle of the artificial-reality device relative to the two-dimensional planar proxy;
determining the viewing angle exceeds a predetermined maximum threshold; and
based on the determination that the viewing angle of the artificial-reality device exceeds the predetermined maximum threshold, terminating the display of the left-display image on the left-eye display and the right-display image on the right-eye display.

2. The method of claim 1, further comprising:
receiving configuration data from the second computing system, wherein the configuration data from the second computing system comprises one or more properties of the first camera and the second camera of the second computing system;
receiving configuration data from a third computing system, wherein the configuration data from the third computing system comprises one or more properties of a first camera and a second camera of the third computing system;
adjusting, based on the configuration data from the second and third computing systems, the pose of the two-dimensional planar proxy within the three-dimensional environment.

3. The method of claim 1, wherein the first camera and the second camera are located at a distance less than human interpupillary distance from one another on an ordinate plane.

4. The method of claim 3, further comprising the first computing system or the second computing system adjusting a location of the first camera or the second camera on the ordinate plane.

5. The method of claim 1, further comprising:
selecting a portion of the first captured image containing the user;
selecting a portion of the second captured image containing the user;
wherein the left display image is rendered based on the selected portion of the first captured image and the right display image is rendered based on the selected portion of the second captured image.

6. The method of claim 1, further comprising:
determining a red/green/blue (RGB) color value of one or more pixels in the first image;
determining a red/green/blue (RGB) color value of one or more corresponding pixels in the second image; and
adjusting the RGB color value of the one or more pixels in the first image to match the RGB color value of the one or more corresponding pixels in the second image.

7. One or more computer-readable non-transitory storage media embodying software that is operable when executed by a first computing system associated with an artificial-reality device to:
receive, through a network, video data of a user of a second computing system, the video data comprising a first captured image of the user and a second captured image of the user of the second computing system, wherein the first captured image and the second captured image are captured concurrently by a first camera and a second camera of the second computing system, respectively;
generate a two-dimensional planar proxy of the user of the second computing system for displaying the user of the second computing system, wherein the two-dimensional planar proxy of the user of the second computing system is generated without a three-dimensional model of the user of the second computing system;
determine a pose comprising a location and orientation of the two-dimensional planar proxy within a three-dimensional virtual environment, wherein the pose of the two-dimensional planar proxy is (1) a fixed pose in the three-dimensional virtual environment independent from a pose of the artificial-reality device in the three-dimensional virtual environment, or (2) a relative pose such that a spatial relationship between the artificial-reality device and the two-dimensional planar proxy remains fixed as the artificial-reality device moves in the three-dimensional virtual environment;
render a left display image for a left-eye display of the artificial-reality device based on the two-dimensional planar proxy having the determined pose and the first captured image;
render a right display image for a right-eye display of the artificial-reality device based on the two-dimensional planar proxy having the determined pose and the second captured image;
display the rendered left display image and the right display image using the left-eye display and right-eye display, respectively;
determine a viewing angle of the artificial-reality device relative to the two-dimensional planar proxy;
determine the viewing angle exceeds a predetermined maximum threshold; and
based on the determination that the viewing angle of the artificial-reality device exceeds the predetermined maximum threshold, terminate the display of the left-display image on the left-eye display and the right-display image on the right-eye display.

8. The media of claim 7, wherein the software is further operable when executed to:
receive configuration data from the second computing system, wherein the configuration data from the second computing system comprises one or more properties of the first camera and the second camera of the second computing system;
receive configuration data from a third computing system, wherein the configuration data from the third computing system comprises one or more properties of a first camera and a second camera of the third computing system;
adjust, based on the configuration data from the second and third computing systems, the pose of the two-dimensional planar proxy within the three-dimensional environment.

9. The media of claim 7, wherein the first camera and the second camera are located at a distance less than human interpupillary distance from one another on an ordinate plane.

10. The media of claim 9, wherein the software is further operable when executed by the first computing system or the second computing system to adjust a location of the first camera or the second camera on the ordinate plane.

11. The media of claim 7, wherein the software is further operable when executed to:
  select a portion of the first captured image containing the user;
  select a portion of the second captured image containing the user;
  wherein the left display image is rendered based on the selected portion of the first capture image and the right display image is rendered based on the selected portion of the second captured image.

12. The media of claim 7, wherein the software is further operable when executed to:
  determine a red/green/blue (RGB) color value of one or more pixels in the first image;
  determine a red/green/blue (RGB) color value of one or more corresponding pixels in the second image; and
  adjust the RGB color value of the one or more pixels in the first image to match the RGB color value of the one or more corresponding pixels in the second image.

13. A first computing system associated with an artificial-reality device comprising:
  one or more processors; and
  one or more computer-readable non-transitory storage media coupled to one or more of the processors and comprising instructions operable when executed by one or more of the processors to cause the system to:
    receive, through a network, video data of a user of a second computing system, the video data comprising a first captured image of the user and a second captured image of the user of the second computing system, wherein the first captured image and the second captured image are captured concurrently by a first camera and a second camera of the second computing system, respectively;
    generate a two-dimensional planar proxy of the user of the second computing system for displaying the user of the second computing system, wherein the two-dimensional planar proxy of the user of the second computing system is generated without a three-dimensional model of the user of the second computing system;
    determine a pose comprising a location and orientation of the two-dimensional planar proxy within a three-dimensional virtual environment, wherein the pose of the two-dimensional planar proxy is (1) a fixed pose in the three-dimensional virtual environment independent from a pose of the artificial-reality device in the three-dimensional virtual environment, or (2) a relative pose such that a spatial relationship between the artificial-reality device and the two-dimensional planar proxy remains fixed as the artificial-reality device moves in the three-dimensional virtual environment;
    render a left display image for a left-eye display of the artificial-reality device based on the two-dimensional planar proxy having the determined pose and the first captured image;
    render a right display image for a right-eye display of the artificial-reality device based on the two-dimensional planar proxy having the determined pose and the second captured image;
    display the rendered left display image and the right display image using the left-eye display and right-eye display, respectively;
    determine a viewing angle of the artificial-reality device relative to the two-dimensional planar proxy;
    determine the viewing angle exceeds a predetermined maximum threshold; and
    based on the determination that the viewing angle of the artificial-reality device exceeds the predetermined maximum threshold, terminate the display of the left-display image on the left-eye display and the right-display image on the right-eye display.

14. The system of claim 13, wherein the processors are further operable when executing the instructions to:
  receive configuration data from the second computing system, wherein the configuration data from the second computing system comprises one or more properties of the first camera and the second camera of the second computing system;
  receive configuration data from a third computing system, wherein the configuration data from the third computing system comprises one or more properties of a first camera and a second camera of the third computing system;
  adjust, based on the configuration data from the second and third computing systems, the pose of the two-dimensional planar proxy within the three-dimensional environment.

15. The system of claim 13, wherein the first camera and the second camera are located at a distance less than human interpupillary distance from one another on an ordinate plane.

16. The system of claim 13, wherein the processors are further operable when executing the instructions to adjust a location of the first camera or the second camera on the ordinate plane.

17. The system of claim 13, wherein the processors are further operable when executing the instructions to:
  select a portion of the first captured image containing the user;
  select a portion of the second captured image containing the user;
  wherein the left display image is rendered based on the selected portion of the first captured image and the right display image is rendered based on the selected portion of the second captured image.

18. The system of claim 13, wherein the processors are further operable when executing the instructions to:
  determine a red/green/blue (RGB) color value of one or more pixels in the first image;
  determine a red/green/blue (RGB) color value of one or more corresponding pixels in the second image; and
  adjust the RGB color value of the one or more pixels in the first image to match the RGB color value of the one or more corresponding pixels in the second image.

* * * * *